April 25, 1967     T. F. LOWRANCE     3,316,010

STICK HOLDER FOR FOOD ITEMS

Filed July 16, 1965

INVENTOR
Thomas F. Lowrance

BY Cecil L. Wood

ATTORNEY 3,316,010
STICK HOLDER FOR FOOD ITEMS
Thomas F. Lowrance, 3626 Samuell Blvd.,
Dallas, Tex. 75223
Filed July 16, 1965, Ser. No. 472,479
1 Claim. (Cl. 294—87)

This invention relates to a stick holder and dipping tool, and it has particular reference to a stick holder and dipping tool for use in making an edible known as a "dog on a stick," a food comprising a weiner covered with a batter mix and cooked in deep oil, and for making frozen confections, such as "Popsicles," and other foods which are formed on sticks.

A "dog on a stick," as described, is usually made by impaling a weiner on a stick, longitudinally thereof, with an end portion of the stick extending beyond the adjacent end of the weiner, for use as a handle, and thereafter dipping the weiner in a batter mix, whereby a surface covering consisting of said batter mix is uniformly applied thereto, and finally dipping the weiner in a body of heated oil whereby the weiner and its batter mix surface covering are cooked together, in place on the stick, while suspending the weiner from the stick.

A prime object of the invention is that of providing an elongated stick holder and dipping tool, for use in conjunction with other machinery arranged in an assembly line whereby the product is adapted to be produced in large quantities, having means for rigidly and removably supporting a plurality of sticks in parallel, spaced apart relation to each other, either in a horizontally extending position, preparatory to impaling weiners on the respective sticks simultaneously, or in a vertically extending position, preparatory to dipping the weiners successively in batter mix and in heated oil.

A further object of the invention resides in the provision of an elongated stick holder and dipping tool as described having a pair of elongated handles connected to its opposite end portions and extending laterally outwardly from one side thereof, perpendicular to the holder and parallel to each other, and having longitudinally spaced means intermediate its ends for selective clamping engagement with the adjacent end portions of a plurality of sticks whereby said sticks are adapted to be rigidly and removably connected at one end to said holder and in their connected positions are adapted to extend laterally outwardly from the side of the holder opposite said one side thereof, perpendicular to the holder and in parallel, spaced apart relation to each other.

Broadly, the invention contemplates the provision of an elongated stick holder and dipping tool as described which in one form thereof comprises a pair of elongated tubular elements of relatively larger and smaller transverse dimensions arranged in axially aligned, telescoping relation to each other, said tubular elements each having a series of longitudinally spaced holes in two opposite sides thereof for engagement by said sticks, said holes being arranged in pairs and a pair of holes of one of the tubular elements being aligned with a corresponding pair of holes of the other of the tubular elements in one position of the tubular elements relative to each other, whereby said sticks may be readily passed through the aligned holes, yieldable means adjacent one end of the holder acting on said tubular elements to bias them in longitudinal direction relative to each other whereby said sticks are adapted to be securely clamped between the corresponding holes of the respective tubular elements, and a crank lever on the opposite end of the holder acting on said tubular elements to move them longitudinally relative to each other in a direction opposite said first mentioned direction, against the resistance of said yieldable means, whereby said sticks are adapted to be disengaged from the holder While the foregoing objects are paramount, other and lesser objects will become apparent as the description proceeds, when considered in connection with the appended drawings wherein:

FIGURE 1 is a perspective view of a stick holder and dipping tool embodying the invention, showing a plurality of sticks each having one of its ends rigidly and removable connected to the holder intermediate its ends, perpendicular to the holder and in parallel, spaced apart relation to each other, showing the holder in one of its operative positions in which the sticks extend horizontally from the side of the holder opposite its handles, and showing a plurality of weiners impaled on the sticks, respectively.

Figure 2:
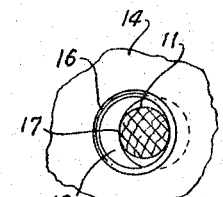
FIGURE 2 is an enlarged fragmentary view illustrating how one of the sticks is clamped between the aligned holes of the respective tubular elements.
Figure 3:
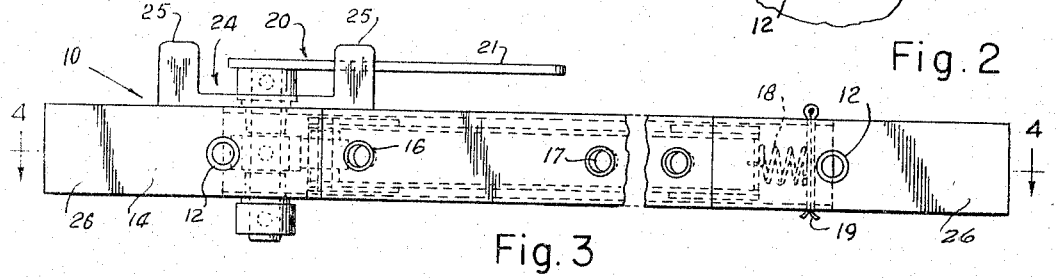
FIGURE 3 is a longitudinal view on an enlarged scale showing one side of the holder.
Figure 4:
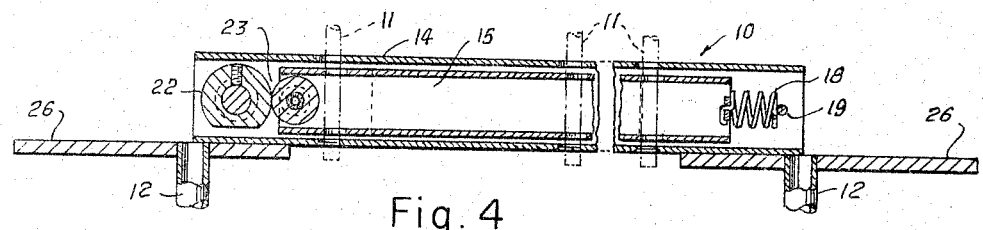
FIGURE 4 is a longitudinal sectional view taken on the line 4—4 of FIGURE 3.
Figure 5:
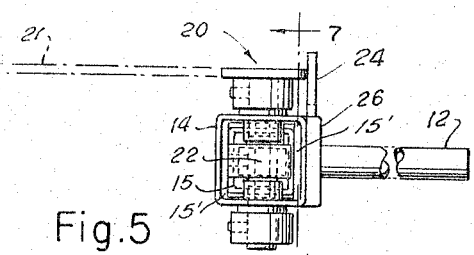

FIGURE 5 is an end view on an enlarged scale showing the crank lever, showing in solid lines the position of the crank lever as illustrated in FIGURES 3 and 4, in which the sticks are clamped to the holder as illustrated in FIGURE 2, and showing in broken lines the position of the crank lever upon rotating it 90 degrees from the position shown in FIGURES 3 and 4, whereby the sticks are adapted to be disengaged from the holder.

Figure 6:
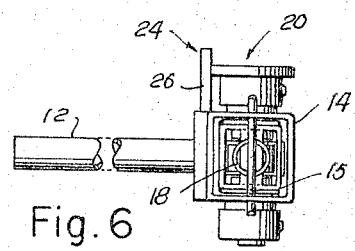
Figure 7:
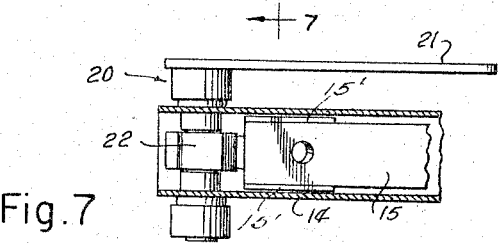

FIGURE 6 is an end view on an enlarged scale showing the end of the holder opposite the end thereof shown in FIGURE 5, showing the compression spring whereby the tubular elements are biased in a longitudinal direction relative to each other, and FIGURE 7 is a transverse sectional view taken on the line 7—7 of FIGURE 5.

Figure 1:
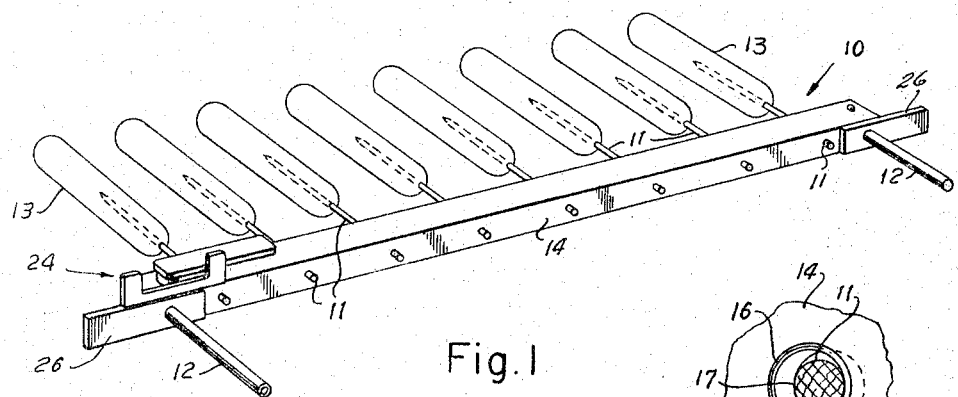

Referring to FIGURE 1 of the drawing, the numeral 10 designates generally an elongated stick holder and dipping tool embodying the invention, and the numerals 11 indicate a plurality of sticks each having one of its ends rigidly and removably connected to the holder 10 intermediate its ends, perpendicular to the holder 10 and in parallel, spaced apart relation to each other. The holder 10 is shown in one of its operative positions in which the sticks 11 extend horizontally from the side of the holder 10 opposite a pair of handles as hereinafter described, which are indicated by the numerals 12. A plurality of weiners, designated by the numerals 13, are impaled on the sticks 11, respectively, The handles 12, which are elongated and advantageously may be formed of tubular or strap material, are connected to opposite end portions of the holder 10 and extend laterally outwardly from one side thereof, perpendicular to the holder 10 and parallel to each other. The handles may also be used to attach the holder 10 to a conveyor for transporting through the fryer or cooker (not shown).

The holder 10 comprises a pair of elongated tubular elements 14 and 15 of relatively larger and smaller transverse dimensions, respectively, which are arranged in axially aligned, telescoping relation to each other. The handles 12 are connected to the outer tubular element 14, which extends longitudinally beyond opposite ends of the inner tubular element 15. To provide a relatively close tolerance between the inner and outer tubular elements 14 and 15, a plate 15' is welded, or otherwise secured, to each side of the inner element 15, as shown in FIGURES 5 and 7.

The tubular elements 14, 15 each have a series of longitudinally spaced holes, designated by the numerals 16, 17, in two opposite sides thereof for engagement by the sticks 11. The holes 16, 17 are arranged in pairs and a pair of holes 16 of the outer tubular element 14 is aligned with a corresponding pair of holes 17 of the inner tubular element 15 in one position of the tubular elements 14, 15 relative to each other, whereby the sticks 11 may be readily passed through the aligned holes 16, 17.

A compression spring 18, which is positioned adjacent one end of the holder 10 and is secured in the adjacent end portion of the outer tubular element 14 by a cotter pin 19, acts on the tubular elements 14, 15 to bias them in a longitudinal direction relative to each other whereby the sticks 11 are adapted to be securely clamped between the corresponding holes 16, 17 of the respective tubular elements 14, 15.

A crank lever 20, which is positioned adjacent the end of the holder 10 opposite the compression spring 18 and is connected to the adjacent end portion of the outer tubular element 14, has a handle 21 on one of its ends and has a cam 22 on its opposite end which coacts with a roller or bearing 23, which is rotatably mounted on the adjacent end of the inner tubular element 15, to move the tubular elements 14, 15 longitudinally relative to each other, against the resistance of the compression spring 18, whereby the sticks 11 are adapted to be disengaged from the holder 10.

The numeral 24 designates a plate which is connected to one end of the outer tubular element 14 and has stops 25 thereon for abutting engagement by the handle 21 of the crank lever 20 to limit rotative movement thereof in either direction.

The numerals 26 indicate a pair of reinforcing plates which are connected to opposite end portions of the outer tubular element 14 whereby the handles 12 and the plate 24 are connected thereto. The elements 26 may also function to support the assembly on tracks, or other device, when used in connection with an automatic conveyor.

The invention may be modified within certain limitations by persons skilled in the art without departing from the spirit and intent thereof or the scope of the appended claim.

What is claimed is:

An elongated stick holder and dipping tool comprising a pair of elongated tubular elements of relatively larger and smaller transverse dimensions arranged in axially aligned, telescoping relation to each other, said tubular elements each having a series of longitudinally spaced holes in two opposite sides thereof for selective engagement by a plurality of sticks, said holes being arranged in pairs and a pair of holes of one of the tubular elements being aligned with a corresponding pair of holes of the other of the tubular elements in one position of the tubular elements relative to each other, whereby said sticks may be readily passed through the aligned holes, yieldable means adjacent one end of the holder acting on said tubular elements to bias them in a longitudinal direction relative to each other whereby said sticks are adapted to be securely clamped between the corresponding holes of the respective tubular elements, and a crank lever adjacent the end of the holder opposite said one end thereof acting on said tubular elements to move them longitudinally relative to each other in a direction opposite said first mentioned direction, against the resistance of said yieldable means, whereby said sticks are adapted to be disengaged from the holder.

References Cited by the Examiner

FOREIGN PATENTS 1,016,435   8/1952   France.

GERALD M. FORLENZA, *Primary Examiner.*

G. F. ABRAHAM, *Assistant Examiner.*